(12) United States Patent
Dickson (10) Patent No.: US 11,141,024 B2
(45) Date of Patent: Oct. 12, 2021

(54) VOICE ACTIVATED SELF-CLEANING SHOWER WITH PROGRAMMABLE SETTINGS FOR INDIVIDUALS

(71) Applicant: Mark Dickson, Orangeburg, SC (US)

(72) Inventor: Mark Dickson, Orangeburg, SC (US)

( * ) Notice: Subject to any disclaimer, the term of this patent is extended or adjusted under 35 U.S.C. 154(b) by 217 days.

(21) Appl. No.: 16/572,692

(22) Filed: Sep. 17, 2019

(65) Prior Publication Data

US 2021/0076878 A1    Mar. 18, 2021

(51) Int. Cl.
*A47K 3/28* (2006.01)
*G10L 15/22* (2006.01)
*G10L 15/07* (2013.01)
*A47K 3/00* (2006.01)

(52) U.S. Cl.
CPC .............. *A47K 3/281* (2013.01); *A47K 3/001* (2013.01); *G10L 15/07* (2013.01); *G10L 15/22* (2013.01); *G10L 2015/223* (2013.01)

(58) Field of Classification Search
CPC ........ A47K 3/001; A47K 3/281; G10L 15/07; G10L 15/22; G10L 2015/223
See application file for complete search history.

(56) References Cited

U.S. PATENT DOCUMENTS

| | | | |
|---|---|---|---|
| 3,742,520 A | 7/1973 | Bernardi | |
| 3,747,129 A | 7/1973 | Dyar | |
| 4,383,341 A | 5/1983 | Altman | |
| 4,420,811 A * | 12/1983 | Tarnay | G05D 23/1393 137/561 R |
| 5,414,879 A * | 5/1995 | Hiraishi | G05D 23/1393 4/601 |
| 5,452,485 A | 9/1995 | Ross | |
| 5,652,971 A | 8/1997 | Wokas | |
| 6,317,717 B1 * | 11/2001 | Lindsey | E03C 1/055 137/559 |
| 6,463,600 B1 * | 10/2002 | Conway | A47K 3/001 222/325 |
| 6,742,199 B2 | 6/2004 | Conway | |
| 7,980,713 B2 | 7/2011 | Nielsen | |
| 9,098,993 B2 | 8/2015 | Reed | |
| 2005/0166945 A1 * | 8/2005 | Whitmore | B08B 3/02 134/18 |
| 2013/0167938 A1 * | 7/2013 | Stimpson | E03C 1/05 137/2 |
| 2016/0150919 A1 * | 6/2016 | Dickson | A47K 3/281 239/69 |

* cited by examiner

*Primary Examiner* — Ryan A Reis
(74) *Attorney, Agent, or Firm* — Donald Debelak (57) ABSTRACT

The inventive device disclosed in the present application is a shower that will clean itself, with rotating sprinkler heads throughout shower, at an independent time, or after receiving a voice command. In addition, the user will be able to use the voice activation feature control to set the water temperature, as well as set the water flow desired from the shower head. The starting point for water temperature and water flow for each independent user is programmed into a CPU, though during showering that temperature and water flow may be adjusted through voice commands or by interfacing with a controller. A green light on the controller indicates for the user that the desired temperature and water flow point have been reached.

2 Claims, 8 Drawing Sheets

VOICE ACTIVATED SELF-CLEANING SHOWER WITH PROGRAMMABLE SETTINGS FOR INDIVIDUALS

RELATED PATENT APPLICATIONS

Application #20160150919A1 Voice Activated Self Cleaning Shower

BACKGROUND—PRIOR ART

US Patents

| Patent # | Kind Code | Issue Date | Inventors |
| --- | --- | --- | --- |
| U.S. Pat. No. 3,747,129 | A | Jul. 24, 1973 | Dillard F Dyar |
| U.S. Pat. No. 3,742,520 | A | Jul. 3, 1973 | Eugene P. Bernardi |
| U.S. Pat. No. 4,383,341 | A | May 17, 1983 | Murray Altman |
| U.S. Pat. No. 5,452,485 | A | Sep. 26, 1995 | Leslie Ross |
| U.S. Pat. No. 5,652,971 | A | Aug. 5, 1997 | Albert P. Wokas |
| U.S. Pat. No. 6,317,717 | B1 | Nov. 11, 2013 | Kenneth R. Lindsey |
| U.S. Pat. No. 6,742,199 | B2 | Jun. 1, 2004 | Daniel P. Conway |
| U.S. Pat. No. 7,980,713 | B2 | Jul. 19, 2011 | Blake Nielsen |
| U.S. Pat. No. 9,098,993 | B2 | Dec. 1, 2014 | Douglas N. Reed |

US Patent Applications

| Application # | Kind Code | Pub. Date | Inventor |
| --- | --- | --- | --- |
| 20050166945 | A1 | Aug. 4, 2005 | Percy Whitmore |

BACKGROUND OF THE INVENTION

Field of the Invention

The inventive device disclosed in the present application general relates to shower devices and more specifically to a voice activated self-cleaning shower system.

Description of the Prior Art

Self-cleaning shower systems are well known in the art. U.S. Pat. No. 3,747,129 to Dyer discloses a system of a self-cleaning shower including a bathroom with a shower and appears to be the first self-cleaning shower.

U.S. Pat. No. 5,452,485 to Ross discloses and claims a gliding tub and shower cleaning device for automatically cleaning a bathtub and shower stall. The device consists or a control center, a tub glider and a shower glider. The tub and shower gliders have brushes attached and are connected to drive systems which move the gliders around the inside of the shower stall and the bathtub on tracks.

In addition to that, U.S. Pat. No. 4,383,341 to Altman discloses and claims a bathtub self-cleaning system that includes a series of pop-out spray nozzles designed to be arranged about the confining walls of a bathtub and the like. The spray nozzles are connected by a manifold to a combined concentrate and diluent mixing control valve. The control valve of the Altman device serves to initially mix the diluent such as water with the concentrate such as a detergent to provide a diluted cleaning solution.

U.S. Pat. No. 6,742,199 to Conway and Kaiser discloses and claims an automatic shower and bathtub cleaning device, with no connection to the water supply piping, that directs cleaning fluid through nozzles that are positioned or adjusted to allow coverage of the entire inside surface of the shower or bathtub enclosure. The device disclosed by Conway and Kaiser consists of a main body, cleaning fluid reservoir, electric pump, nozzles, and a control circuit that allows either local or remote initiation of the device's cleaning cycle operation.

U.S. Pat. No. 7,980,713 to Nielsen discloses and claims an elongated lighting strip. Under the teachings of Nielsen's patent, the lighting strip is positioned inside of a shower or bathtub enclosure to both illuminate the enclosure as well as having a spray to distribute a diffuse aqueous solution onto the enclosure.

Finally, U.S. Published Patent Application No. 20050166945 by Whitmore discloses a cleaning system for automatically cleaning a shower and a method of operating thereof is described. The Whitmore cleaning system comprises a cleaning solution reservoir configured to hold a cleaning solution; a fluid dispensing device configured to dispense the cleaning solution within the shower; a pumping system coupled to the cleaning solution reservoir and configured to supply the cleaning solution from the cleaning solution reservoir to the fluid dispensing device; and a power source coupled to the pumping system, and configured to provide the pumping system with power for pumping the cleaning solution.

In addition to the above patents and application, there is additional prior art targeting specific aspects of this invention.

U.S. Pat. No. 6,317,717 to Lindsey discloses a voice activated system with a CPU controller for controlling hot and cold water in a bathroom and beginning water flow, which recognizes user commands through voice recognition. The voice commands are collected through a microphone.

SUMMARY OF THE INVENTIONS

The inventive device disclosed in the present application is a shower that will clean itself, with rotating sprinkler heads throughout shower, at an independent time, or after receiving a voice command. In addition, the user will be able to use the voice activation feature control to set the water temperature, as well as set the water flow desired from the shower head. The starting point for water temperature and water flow for each independent user is programmed into a CPU, though during showering that temperature and water flow may be adjusted through voice commands or by interfacing with a controller. A green light on the controller indicates for the user that the desired temperature and water flow point have been reached.

An object of the present invention is to provide an easy way to clean the shower after each use by eliminating the need to scrub a dirty shower after the soap and dirt have dried. The rotating sprinkler heads for cleaning the shower will minimize the number of sprinkler heads required.

An additional object of the device disclosed in the present application is to provide users the ability to preset their desired water temperature and water flow requirements, and to have the controller keypad alert them to when the proper water temperature and water flow requirements have been met and to allow users to vary the temperature and water flow through voice commands.

Major Advancements of the Invention

There are many inventions with patents in this category. To clarify the invention for understanding, the novel features of this device are:

1. A programmable control panel that allows individual users to set water temperature and water pressure settings.
2. Sensors that read water temperature and water flow in real times, rather than adjusting the hot and cold water only due to user commands.
3. Voice activated CPU to allow users to vary from their preset water temperature and water flow settings.
4. A green light on the control board to notify user when water temperature and water flow are at their preset levels.
5. Rotational sprinkler heads that allow the shower to be cleaned with fewer sprinkler heads that prior art.
6. A timer to activate the self-cleaning function 10 minutes after the shower has been turned off.

Functions that Can be Voice Activated

1. Select user
2. Raise or low temperature
3. Raise or lower water temperature
4. Start/stop shower
5. Start the self-cleaning process

Programming Sequence

1. Press on/off button
2. Press Program button
3. Name screen will appear (FIG. 4), use the keyboard and right and left arrow buttons to select letters of name, pressing the Select button each time the correct letter is entered.
4. Press the Next Button to go to the next display screen, which will have the users name on it and entry for the desired temperature. (FIG. 5) This can be done wither direct keyboard entry or by pushing the up and down arrow buttons.
5. Press the Next button to go to the next display screen where the users name will appear and the water flow readings of High, Medium and Low will appear. The right water flow can be selected with the up and down arrow buttons.

Run Sequence

1. Push the on/off button.
2. Push the Run button, the first users name will appear.
3. Push the next button till the correct user appears.
4. Push the Select button.
5. The water temperature display will appear, use the up and down arrow to change pre-selected temperature.
6. Push the Select button when the desired temperature is reached
7. The water flow display will appear, Use the up and down arrows to change pre-selected water flow display will appear.
8. The shower will start, with the green light indicating when the water temperature and water flow requirements of the user are reached.

DRAWINGS

Drawings—Description of Reference Numbers

1. CPU.
2. Voltage source.
3. First electric circuit, connecting voltage source to CPU.
4. On/off switch.
5. Receiving antenna.
6. Second electric circuitry, connecting antenna to CPU
7. Motor for adjusting shower valve.
8. Communicating switch to activate rotating nozzles.
9. Third electric circuit, connecting the CPU to the moor that controls the shower valve.
10. Fourth electric circuit connecting the CPU water temperature sensor.
11. Fifth electric circuit connecting the CPU to the water flow sensor
12. Sixth electric circuit connecting the CPU to communication switch that activates the rotating nozzles and moves the diverter valve 18 to send the water to the exit tube 40.
13. Exit tube from the water venturi valve to the rotating nozzles.
14. Mechanical bearing system which operated by the motor 16.
15. Seventh electric circuit connecting the rotating nozzle to the motor 15.
16. Motor that operates the mechanical bearing system, one per rotating nozzle.
17. Rotating nozzle dispensers.
18. Showerhead.
19. Tub manual water controls for hot and cold water.
20. Tub water sprout.
21. Shower enclosure.
22. Control panel.
23. Display.
24. Button to activate programming.
25. Run button to activate shower sequence.
26. Next button to move through programming sequence.
27. Select button confirms display data.
28. Shower button starts shower sequence
29. Clean button starts cleaning sequence
30. Green light indicates when water temperature and water flow are at desired levels.
31. Right arrow to choose a letter on the right in the sequence, example, move from a to b.
32. Left arrow to choose a letter on the left in the sequences, example move from b to a.
33. Keypad.
34. Water flow sensor.
35. Water temperature sensor.
36. Voice commands from antenna
37. Shower valve.
38. Diverter valve to send water to rotating nozzles dispensers.
39. Exit piping to shower head.
40. Exit piping to the rotating nozzle dispensers
41. Container for holding cleaning solution.

DETAILED DESCRIPTION

The device disclosed in the present application is a shower that will clean itself, and a shower that has a programmable CPU where each user can preset the water flow and water temperature, The CPU will also activate a green light when the desired water temperature and water flow has been reached. This device has a voice activated feature that will initiate the self-cleaning feature, allow the user to start and stop the shower, and allow the user to raise or lower the water temperature or the water flow through voice commands.

Figure 1:
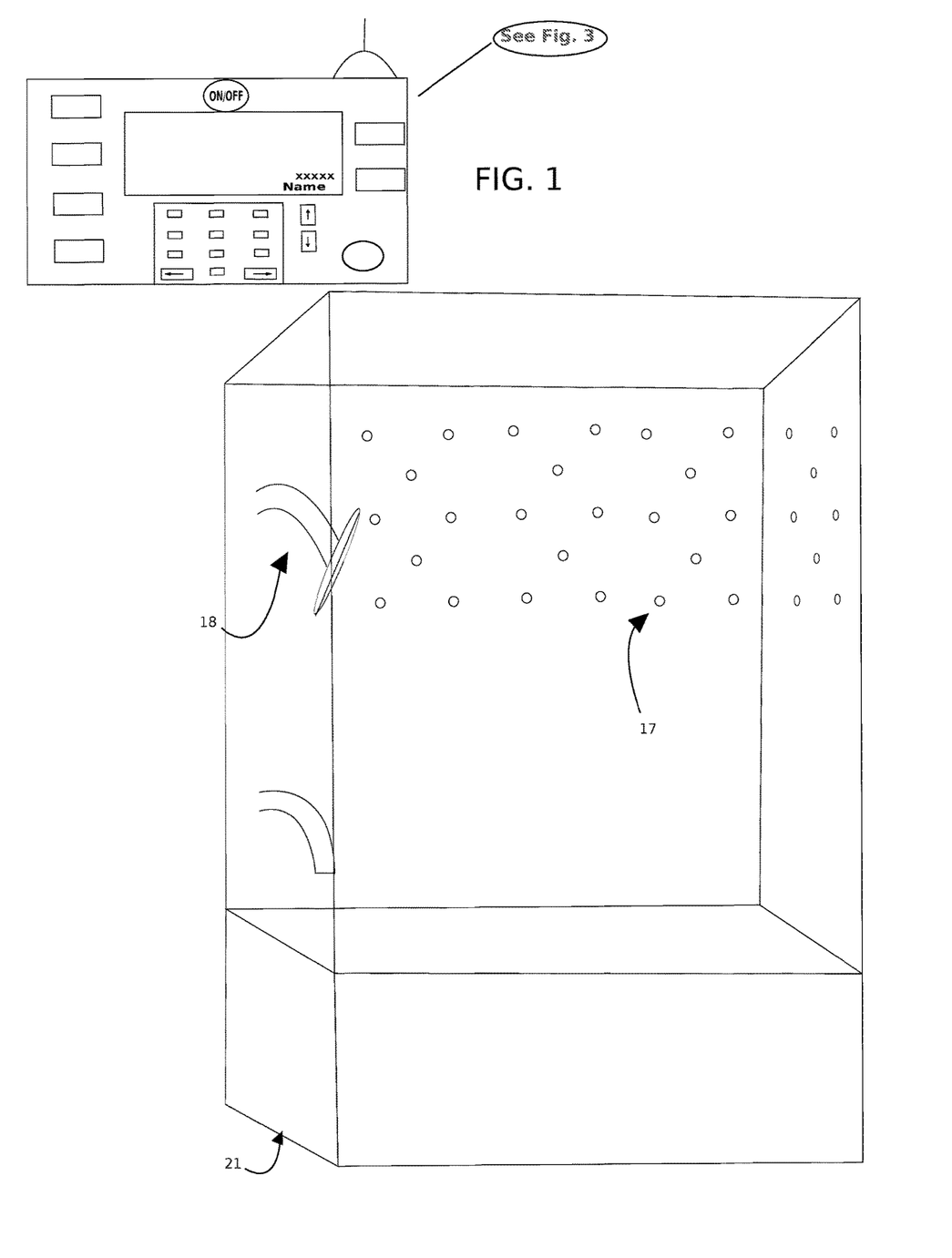
FIG. 1 is a front perspective view of the Voice Activated Self-Cleaning Shower device.

FIG. 1 shows a ¾ view of the shower with the rotating nozzle dispensers 17, with the shower head 18, with a view of the control panel 22, which can be placed on any surface somewhat close to the shower enclosure.

Figure 2:
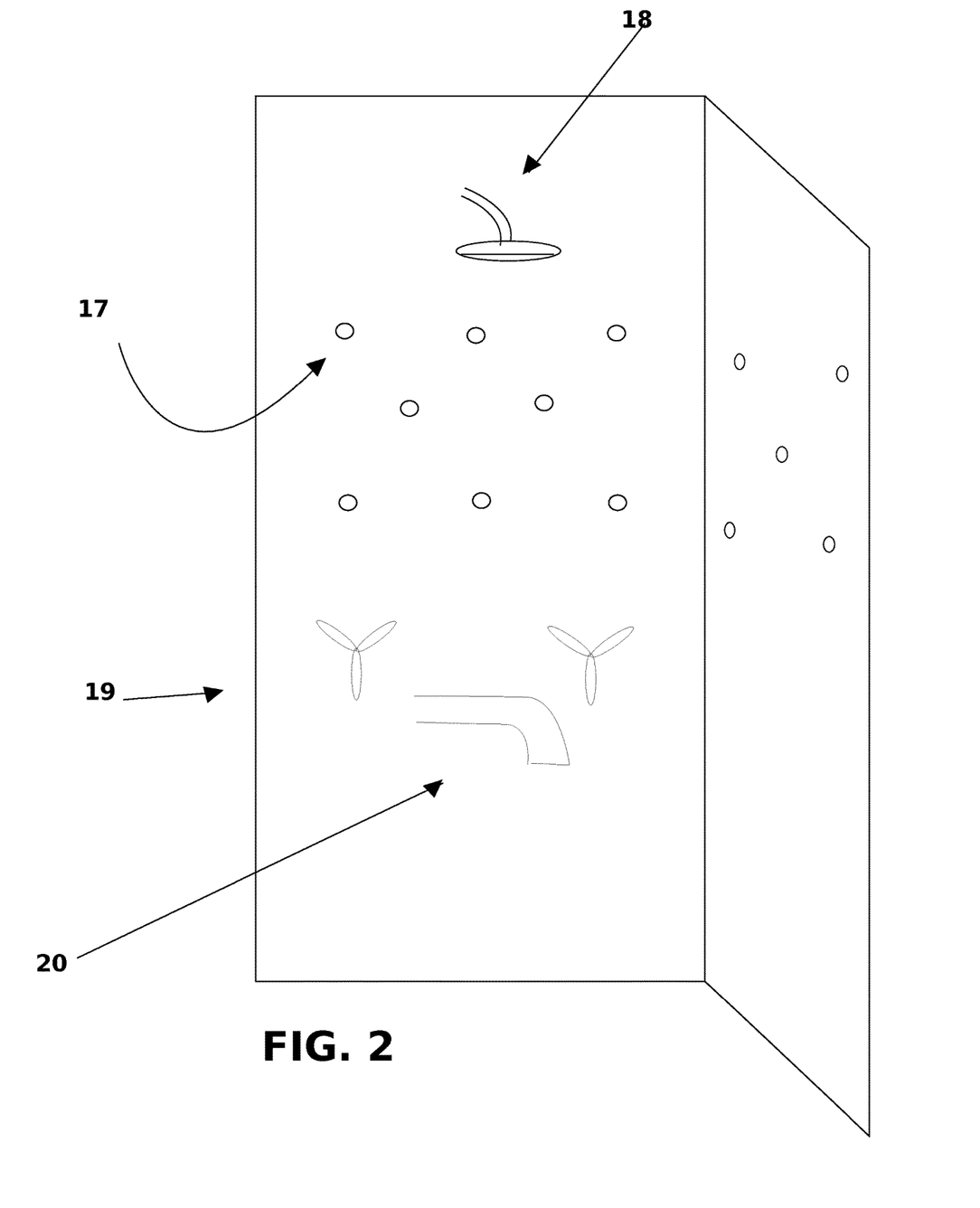
FIG. 2 is a ¾ view of the shower wall with the shower head.

FIG. 2 shows a ¾ view of the wall with the shower head 18, the tub manual controls for hot and cold water 19 and the tub water spout 20 as well as a pattern for the installation of the rotating nozzle dispensers 17.

Figure 3:
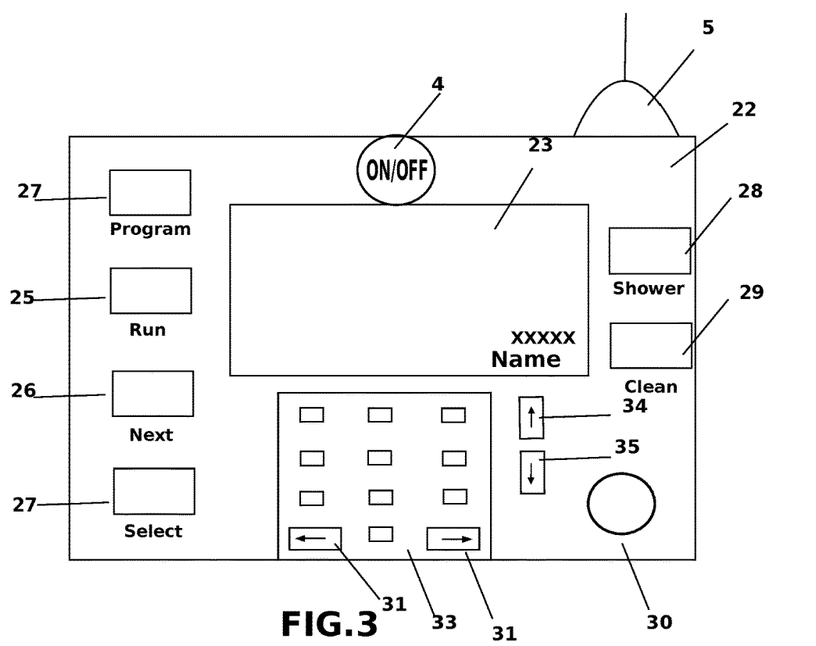
FIG. 3 is front view of the control panel with attached antenna.

FIG. 3 shows the control panel. 22, the display 23, and the key pad 33, with the number and letter combinations set up in the same manner as a traditional phone keypad, with three to four letters listed above or below each number. FIG. 3 also shows, the button 24 to activate programming, the run button 25 to activate shower sequence, a next button 26 to move through the programming sequence, a select button 27 to confirms display data, a shower button 28 to start the shower sequence without with voice activation, a clean button 29, to activate the cleaning cycle without voice activation. FIG. also shows the green button 30 that indicates the desired water temperature and water flow has been reached, the right arrow button 31, and left arrow button, 32, that moves from one letter below the numbers on the keypad 33 to the next letter, and up 34 and down 35 arrow buttons that can adjust water temperature and water flow requirements of a user without voice activation.

Figure 4:
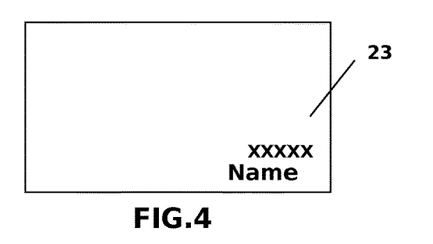
FIG. 4 is a view of the display when a user's name is entered

FIG. 4 shows the actual display screen when a user is programming in their name

Figure 5:
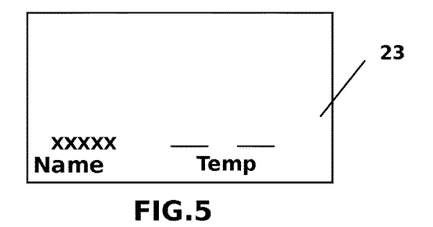
FIG. 5 is a view of the display when a user's desired temperature data is entered.

FIG. 5 shows the display when the user is entering desired water temperature.

Figure 6:
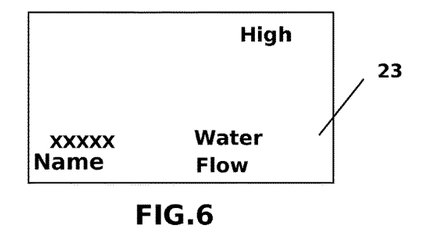
FIG. 6 is a view of the display on the control panel when a user's desired water flow data is entered.

FIG. 6 shows the actual display when the user is entering the desired water temperature.

Figure 7:
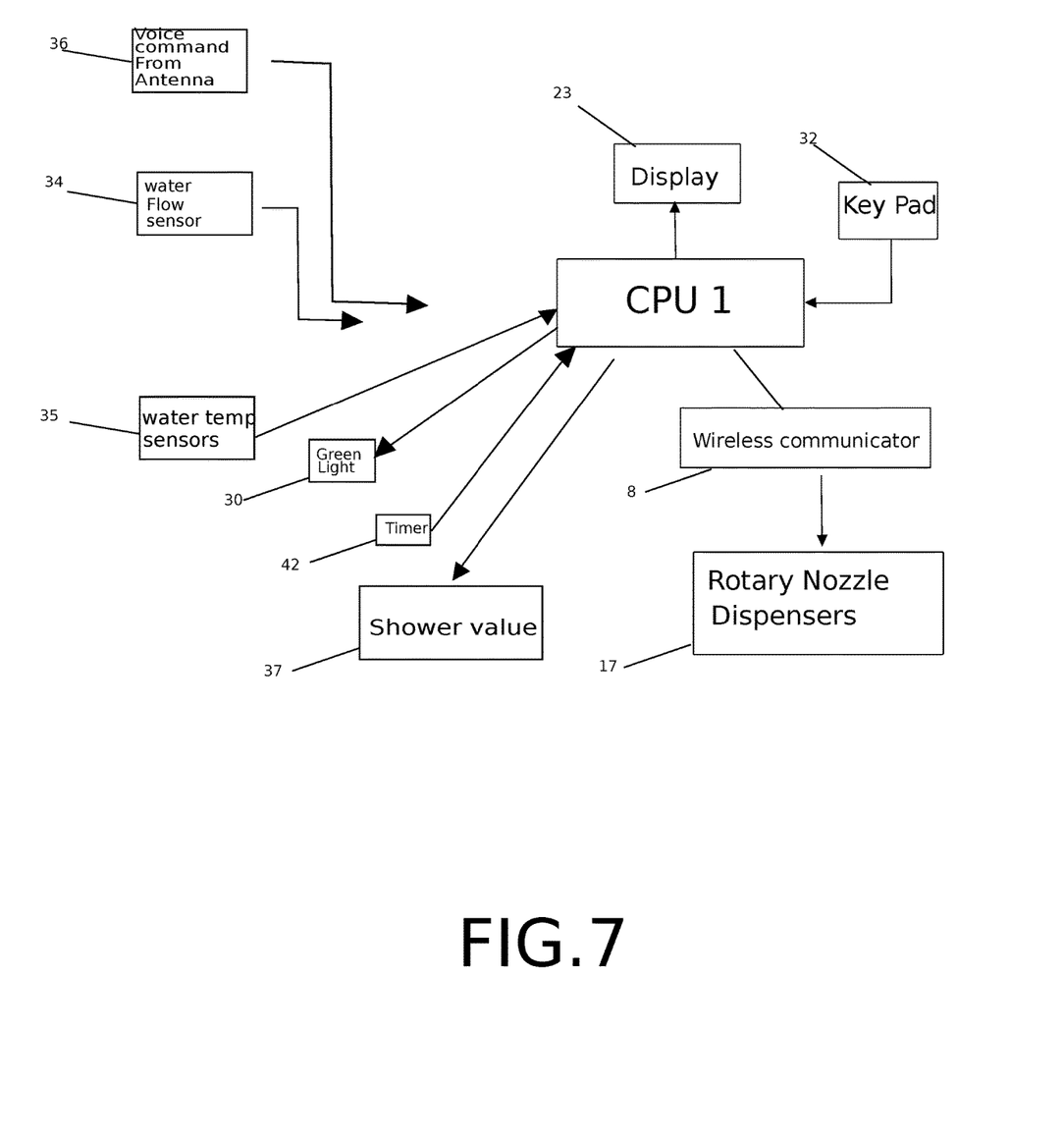
FIG. 7 is a diagrammatic view of the of the CPU and the inputs and outputs from CPU.

FIG. 7 is a diagrammatic representation of the CPU 1 connections. The input connections comprise: the keypad 33; voice activation commands from the antenna 36; the water temperatures sensor 34; the timer 42 and the water flow sensor, 35. The output connections comprise: the display 23; the green light 30 indication desired water temperature and water flow rates have been achieved; the communicator 8 that activates the rotating nozzle dispensers 17; and the shower valve 37.

Figure 8:
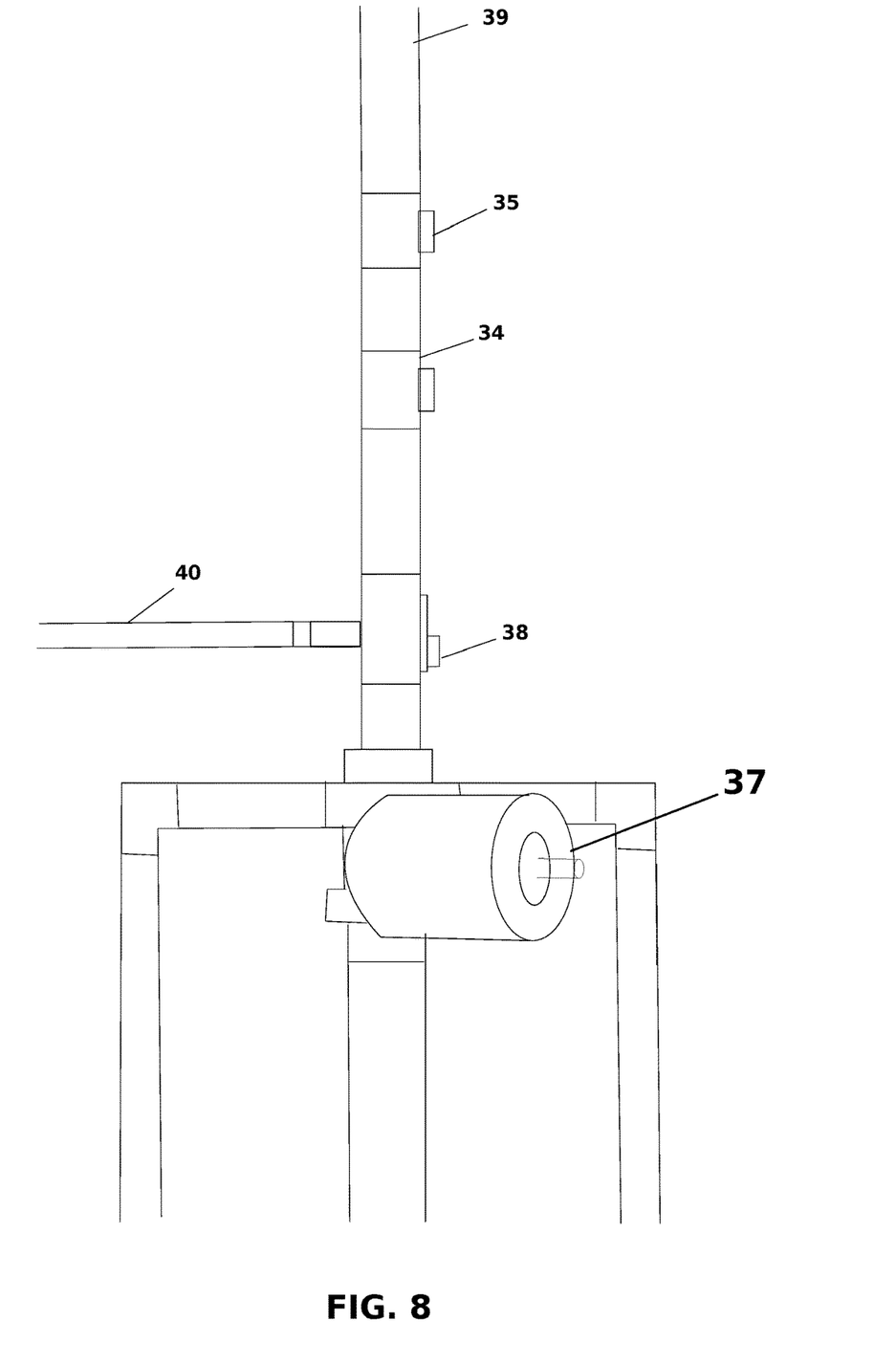
FIG. 8 shows the sensors and plumbing features that are behind the front shower wall.

FIG. 8 shows the hardware behind the wall of the shower from which the shower head 18. The incoming hot and cold pipes and the pipe to the tub water spout 20 are shown but not labeled as they are not part of the invention. The shower valve 37 is electronically controlled by the CPU 1 and controls the water temperature and the water flow in the same manner as a standard shower valve. FIG. 8 shows rising out of the shower valve 37 toward the shower head 18 through exit tube 39 to the shower head 18, first a diverter valve 38 that send the water to the exit tube, 40 to the rotating nozzle dispensers 17, after the diverter valve 38, the water flows through the water flow sensor 34, and the water temperature sensor 35. Wire from all the connections shows they are hard wired back to the CPU 1.

Figure 9:
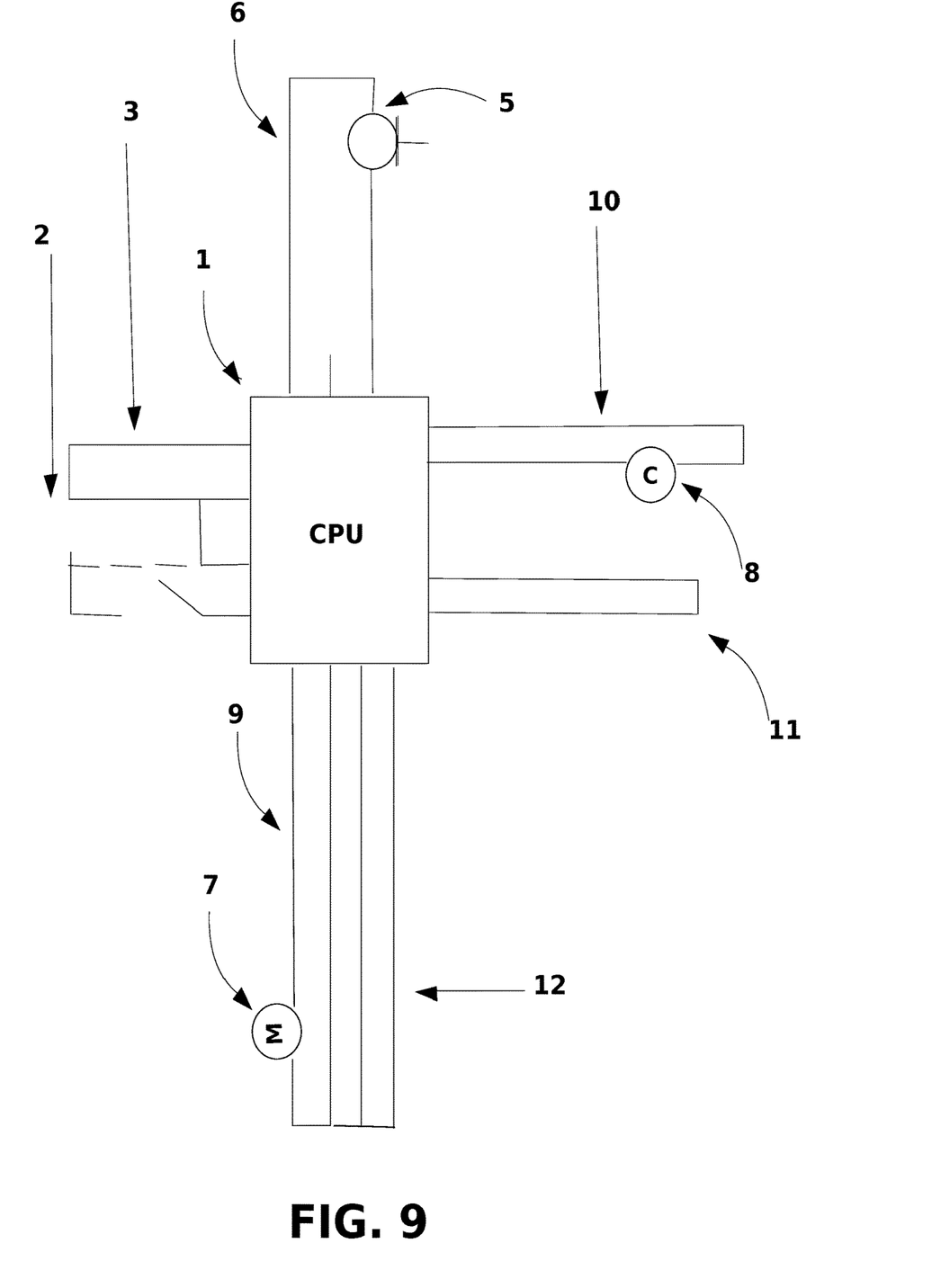
FIG. 9 shows the electronic wiring circuits from the CPU to its inputs and outputs, with the exception of the outputs to the venturi valve and cleaning solution dispensing container.

FIG. 9 shows the electronic connections of the device disclosed in this application comprising a Central Processing Unit or (CPU) 1 powered by a voltage source 2 which is connected via a first electric circuitry 3 having an ON/OFF switch 4; the CPU 1 containing a voice recognition software; a microphone 5; a second electric circuitry 6 which converts the voice input into electric pulses and is sent to the CPU 1, the CPU 1 then controls a third and sixth circuitry; a third circuitry 9 that receives pulses that regulates a motor 7 for the shower valve, which adjusts the shower valve which controls the cold water main and the hot water main and the water flow and a sixth circuitry that controls the communicator 8 which activates the diverter valve 38 and to send the water through exit tube 40 and activates the rotating nozzle dispensers 17.

Figure 10:
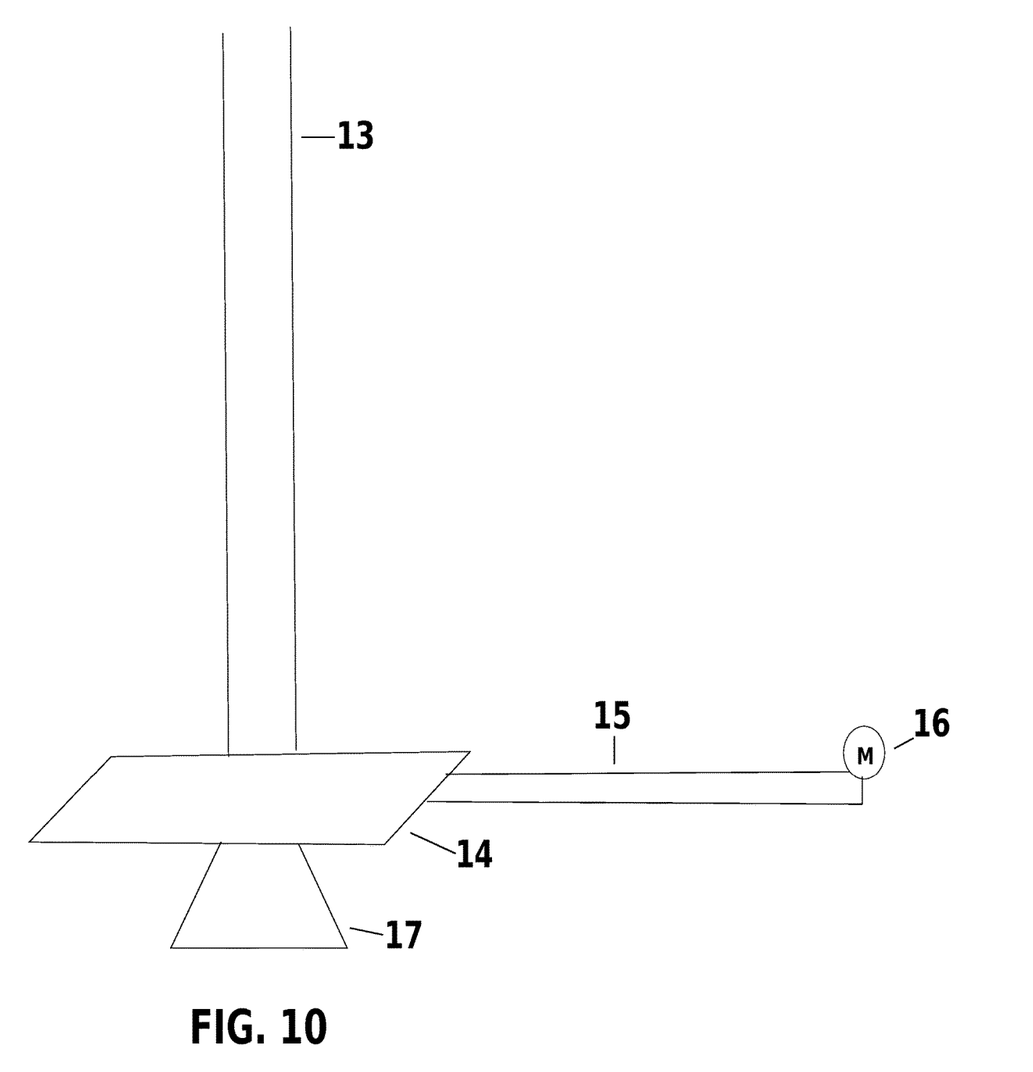
FIG. 10 shows the configuration of motor and electric circle for the rotating nozzle dispensers.

FIG. 10 shows the mechanical and flow characteristics the operate at the rotating nozzle dispensers 17. The exit tube from the water venturi tube 13 (See FIG. 11) flows to the rotating nozzle dispensers 17. A mechanical bearing system 14 is operated by an electronic controller 16 to rotate the rotating action of the rotating nozzle dispensers 17. nozzle. In another embodiment, nozzles 17, and the mechanical bearing system 14 may be Delavan nozzles.

Figure 11:
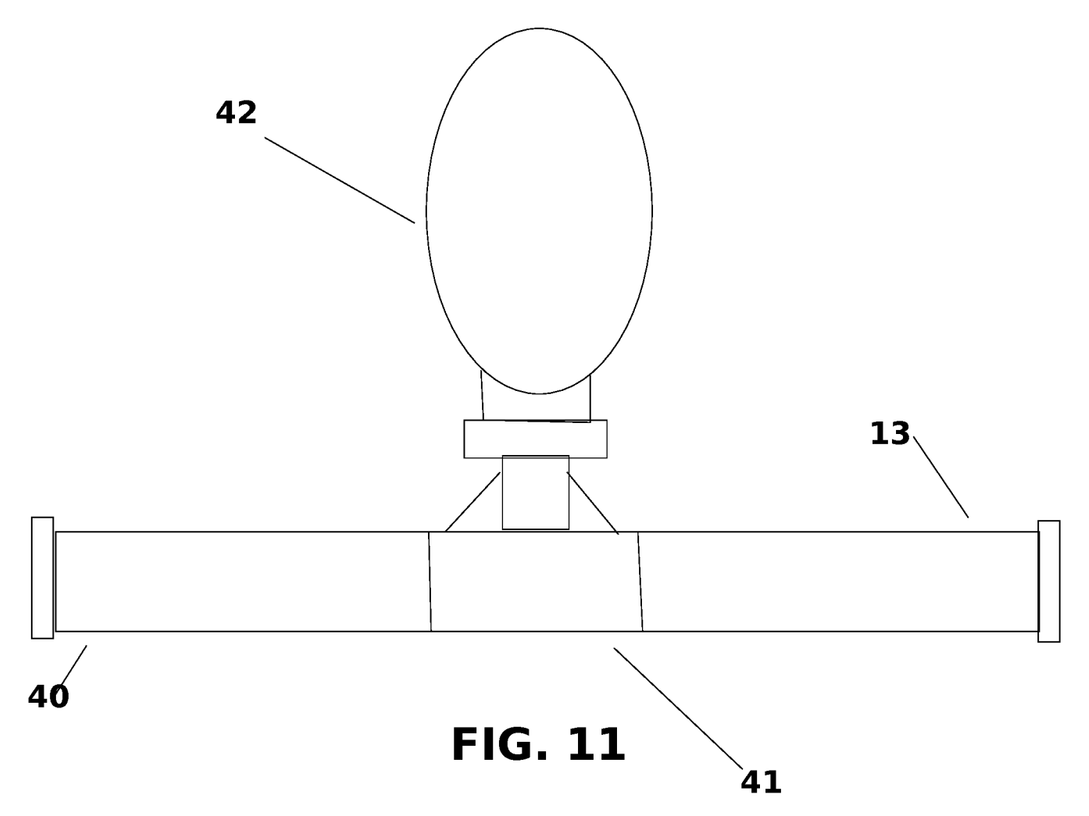
FIG. 11 is a top view of the exit piping going to the rotating nozzle dispenses, the venturi valve and the container for holding the cleaning solution. Note the container mostly sits above the exit tube so most of the cleaning solution can be accessed by the venturi valve.

FIG. 11 show a top view of the venturi valve 41, which is attached exit tube 40 from the diverter 38. The venturi valve 41 is also attached to a container for the cleaning solution 42. The cleaning solution container bottom sits near the exit tube 40, with most of the container 42 being above the exit tube 40.

With respect to the above description then, it is to be realized that the optimum dimensional relationships for the parts of the invention, to include variations is size, materials, shape, form, functionality and manner of operation, assembly and use are deemed readily apparent and obvious to one skilled in the art, and equivalent relationship to those illustrated in the drawings and described in the specification are intended to be encompassed by the device disclosed in the present application.

I claim:

1. A voice activated self-cleaning shower with programmable settings for individuals comprising:

a. a programmable CPU powered by a voltage source to which is connected a first electrical circuitry to an ON/OFF switch;
b. a control panel through which the CPU is programmed the control panel comprising:
a display; a keypad; programming buttons comprised of a program, a run, a next, a select, up and down buttons and left and right buttons;
d. the control panel also having the ON/OFF switch, an antenna, a push button to initiate a shower sequence and a push button to initiate a self-cleaning sequence and a green light to indicate that a desired temperature and water flow levels have been reached;
e. the CPU receiving operating inputs from a water temperature sensor and a water flow sensor to determine commands to either raise or lower water temperature and flow;
e. the programmable CPU also runs a voice recognition software capable to recognize the voice input collected from the antenna on the control panel where said CPU elaborates a voice input collected from said antenna into electrical pulses that regulates the motor that operates the shower valve and electric pulses sent to a communicator to activate a diverter that sends water to an exit tube that goes to a series of rotating nozzle dispersers;
f. the rotating nozzle dispensers rotating due to a mechanical bearing mixer system activated by an independent electric motor.

2. The voice activated self-cleaning shower with programmable settings for individuals of claim 1 where said rotating nozzle dispensers are Delaval nozzles.

* * * * *